INVENTOR.
BENJAMIN F. GERDING
ANTHONY F. LABROZZI
BY
Donald S. Cohen
ATTORNEY

INVENTOR.
BENJAMIN F. GERDING
ANTHONY F. LABROZZI
BY Donald S. Cohen
ATTORNEY.

INVENTOR.
BENJAMIN F. GERDING
ANTHONY F. LABROZZI
BY
Donald S. Cohen
ATTORNEY

United States Patent Office 2,945,613
Patented July 19, 1960

2,945,613

METHOD AND APPARATUS FOR FEEDING ELONGATED OBJECTS FROM A CONTAINER

Benjamin F. Gerding, Chalfont, and Anthony F. Labrozzi, Philadelphia, Pa., assignors to International Resistance Company, Philadelphia, Pa.

Filed Dec. 2, 1955, Ser. No. 550,549

12 Claims. (Cl. 221—198)

This invention relates to a method and apparatus for automatically feeding elongated objects from a container. More particularly it relates to a method and apparatus for feeding electronic components such as resistors from a rectangular box or container.

The present trend in the electronic industry is toward automation in the manufacture of various electronic equipment such as radio and television sets wherein the various electronic components, such as resistors, capacitors and rectifiers, that go into the electronic circuit making up the equipment are handled and assembled automatically by machines. The manufacturers receive the electronic components in packages or containers from which the components are fed into the machines.

Previously, the components were fed into the machines by hand. Such an operation is costly, since it requires a separate operator for each machine and is also time consuming. Another disadvantage of hand feeding the components is that the operator must be very careful in removing the components from the containers. Most of the components are of the type having a rigid central body portion with a lead wire extending from each end thereof. The lead wires are usually made of small diameter tin plated copper wire and are very flexible. Therefore, if the operator is not careful in removing the components from the container, the ends of the lead wires might brush against the sides of the container and thereby bend the leads. With the leads of some of the components being bent, it is very difficult to perform any further operations on the components so that they may be automatically assembled in the desired electronic equipment.

It is therefore an object of this invention to provide a method of automatically feeding elongated objects from a container. Another object is to provide an apparatus for automatically feeding elongated objects from a container. Still another object is to provide an apparatus for automatically feeding from a container electronic components which are arranged in substantially parallel relationship in the container. A still further object is to provide an apparatus for automatically feeding from a container electronic components of the type comprising a central body portion with leads extending from the ends thereof without bending the leads. Other objects of the invention will in part be obvious and will in part appear hereinafter.

The invention accordingly comprises the several steps and the relation of one or more of such steps with respect to each of the others, and the apparatus embodying features of construction, combination of elements and arrangement of parts which are adapted to effect such steps, all as exemplified in the following detailed disclosure, and the scope of the invention will be indicated in the claims.

For a fuller understanding of the nature and objects of the invention, reference should be had to the following detailed description taken in connection with the accompanying drawings in which.

Figures 1, 2:
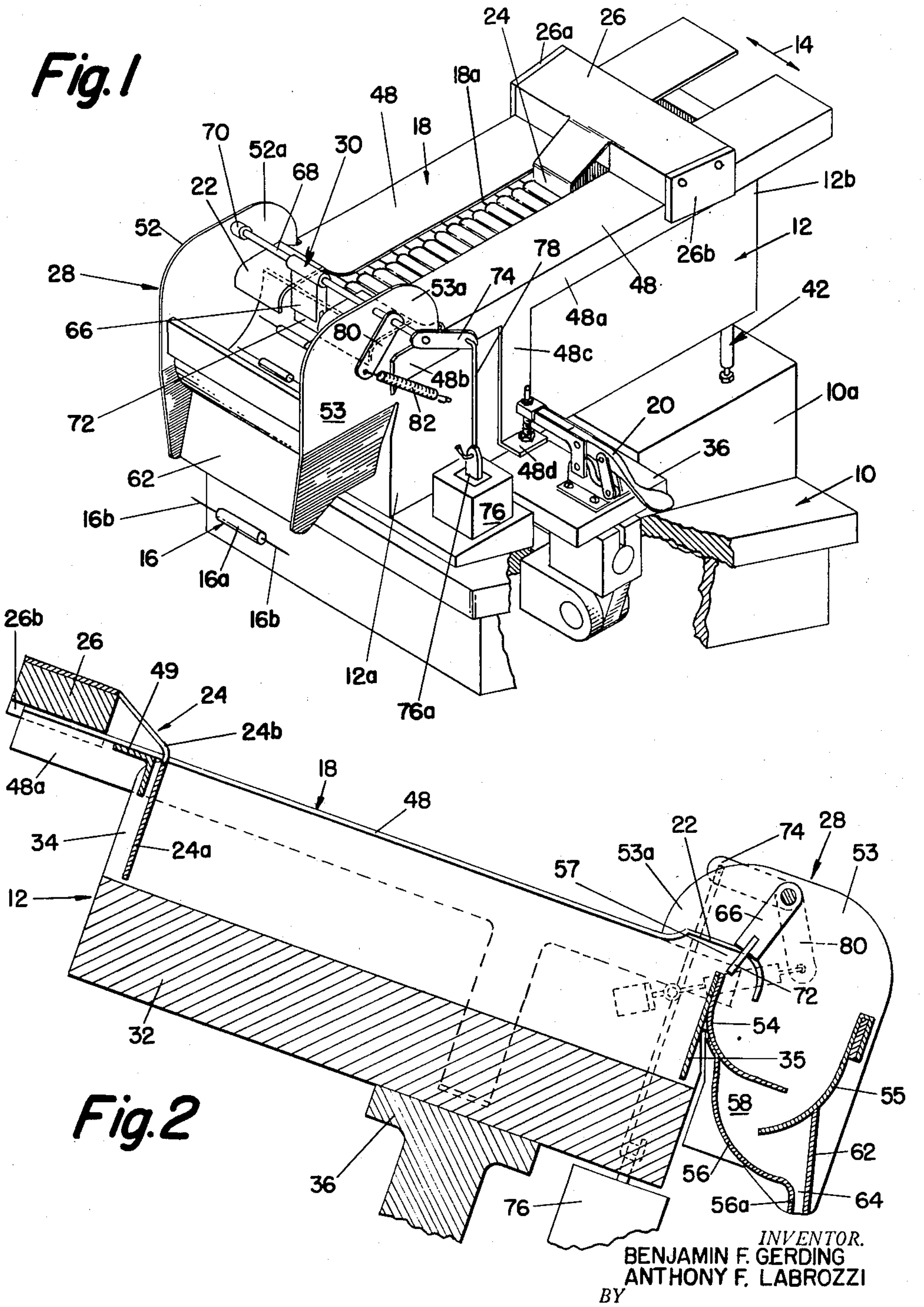
Figure 1 is a perspective view of the apparatus.
Figure 2 is a vertical sectional view of the apparatus taken along lines 2—2 in Figure 4.

Referring to Figure 1 of the drawings, the feeding apparatus comprises in general, a base 10 having a tilted top 10*a*. A substantially rectangular container-holder 12 is mounted on the base 10 in such a manner that the holder can be reciprocated from side to side as indicated by arrow 14. The holder 12 is also tilted by resting on top 10*a* so that its front end 12*a* is lower than its back end 12*b*. Holder 12 has a cover 18 and with this removed, a container filled with the articles is placed therein: the cover having a longitudinal slot 18*a* to expose the articles is then put in position. The articles, here shown to be electrical components 16 are of the type having a rigid body portion 16*a* and a thin wire lead 16*b* extending from each end of the body portion; they are arranged in the container so that they are substantially parallel to the front end of the holder 12. Cover 18 placed over the holder 12 is held tightly in place by clamps 20. The longitudinal slot 18*a* extends throughout the length of the cover and its front end is U-shaped to form guide portion 22 which extends over and is spaced from the front end of the holder 12. A pusher plate 24 extends through slot 18*a* in cover 18 into the holder 12 behind the components and is attached to a weight 26 which slides on the top of the cover 18. As the holder 12 is reciprocated from side to side at high frequency by mechanism which will be described in detail later, the agitation of the components 16 plus the force applied to the components toward the front end of the holder 12 by the weight 26 through the pusher plate 24 causes the components 16 to flow over the front end of the holder 12. As the components 16 flow out of the holder 12 the weight 26 slides down the tilted cover 18 to maintain pressure on the components. The components are guided over the edge of the front end of the holder 12 by the guide portion 22 of the cover and a hopper 28 is attached to the front end of the holder 12 to catch the components and guide them to a machine for further handling. To control the flow of the components, a gate mechanism 30 pivotally supported on the hopper 28 extends through the slot 18*a* in the cover 18 and spans the space beneath the guide portion 22. Mechanism which will be described in detail later is provided to intermittently swing the gate 30 open to allow flow of the components.

Referring to Figures 2 through 5, the container holder 12 comprises in detail a substantially rectangular bottom plate 32, a pair of side walls 33 and 34 and a front wall 35. The holder 12 is mounted on a supporting plate 36 which extends beneath bottom plate 32 adjacent its front end and well beyond the sides of the holder. A pair of clamping arms 37 (Figure 5) extend down from the supporting plate 36 adjacent the ends thereof and a shaft 38 extends through aligned holes 37*a* (Figure 3) in the clamping arms 37, the arms being tightly secured to shaft 38 by bolts 39. The shaft 38 is slidably supported in a bearing block 40 (Figure 5) on the lower end of the tilted base top 10*a* which is supported on legs 10*b*. The bearing block 40 fits between the clamping arms 37 (Figure 5) and cushioning springs 41 fit about shaft 38 between the clamping arms and the bearing block. The back end of the holder 12 is slidably held on an adjustable support generally indicated at 42 in Figure 3. Support 42 comprises a block 43 mounted on top 10*a* of base 10 beneath the back end of the holder 12 and has a flange 43*a* extending from one side adjacent its top edge. A pin 44 fits in a hole 43*b* in the top of the flange 43*a* and a bolt 45 is threaded into a hole 43*c* in the bottom of the flange 43*a* and engages the bottom of the bearing pin 44. A locknut 46 is threaded on the bolt 45 to lock the positioning of the bolt. A bearing plate 47, mounted on the lower surface of the bottom plate 32, rides on bearing pin 44. The bearing plate 47 is of a harder material than the bearing pin 44 so that any wear will be on the pin and such wear can be compensated for by means of bolt 45. Thus, the holder 12 is mounted on the base 10 with its front end lower than its back end and it can be reciprocated from side to side as indicated by arrow 14 in Figures 1 and 5.

The cover 18 comprises a pair of plates 48 (Figures 1 and 2) secured together in spaced parallel relation by a connecting strip 49 (Figure 2). The plates 48 extend beyond the back end of holder 12 and the connecting strip 49 is positioned at the back end of holder 12 leaving the slot 18*a*, formed therebetween opening at its front end into hopper 28. The front of plates 48 curve over the front wall 35 (Figure 2) to form the U-shaped guide portion 22. Guide portion 22 is spaced from the front wall 35 a sufficient distance to provide a passage 57 (Figure 2) between the wall and guide portion preferably large enough to allow one component to pass therethrough. Each of the plates 48 has a longitudinal flange 48*a* (Figures 1 and 3) extending downwardly alongside side walls 33 and 34 of container 12 to prevent sidewise motion between the cover 18 and the holder 12. Flanges 48*a* extend throughout the length of the plates 48 and each has an extension 48*b* (Figures 1, 3 and 4) at its front end extending adjacent and spaced from the guide portions 22 to provide a slot 51 therebetween. A downwardly extending arm 48*c* (Figures 1 and 3) extends from each flange 48*a* at a point over the supporting plate 36 and has a flange 48*d* at its end extending substantially parallel to the supporting plate 36. Clamps 20, which as shown are preferably of the toggle type, are mounted on supporting plate 36 on each side of the holder 12. The clamps 20 are positioned so that when the handles 20*a* thereof are pressed down, the clamping head 20*b* (Figure 5) presses down on the hold down flange 48*d* to hold the cover 18 on the holder 12 firmly.

Figures 3, 4:
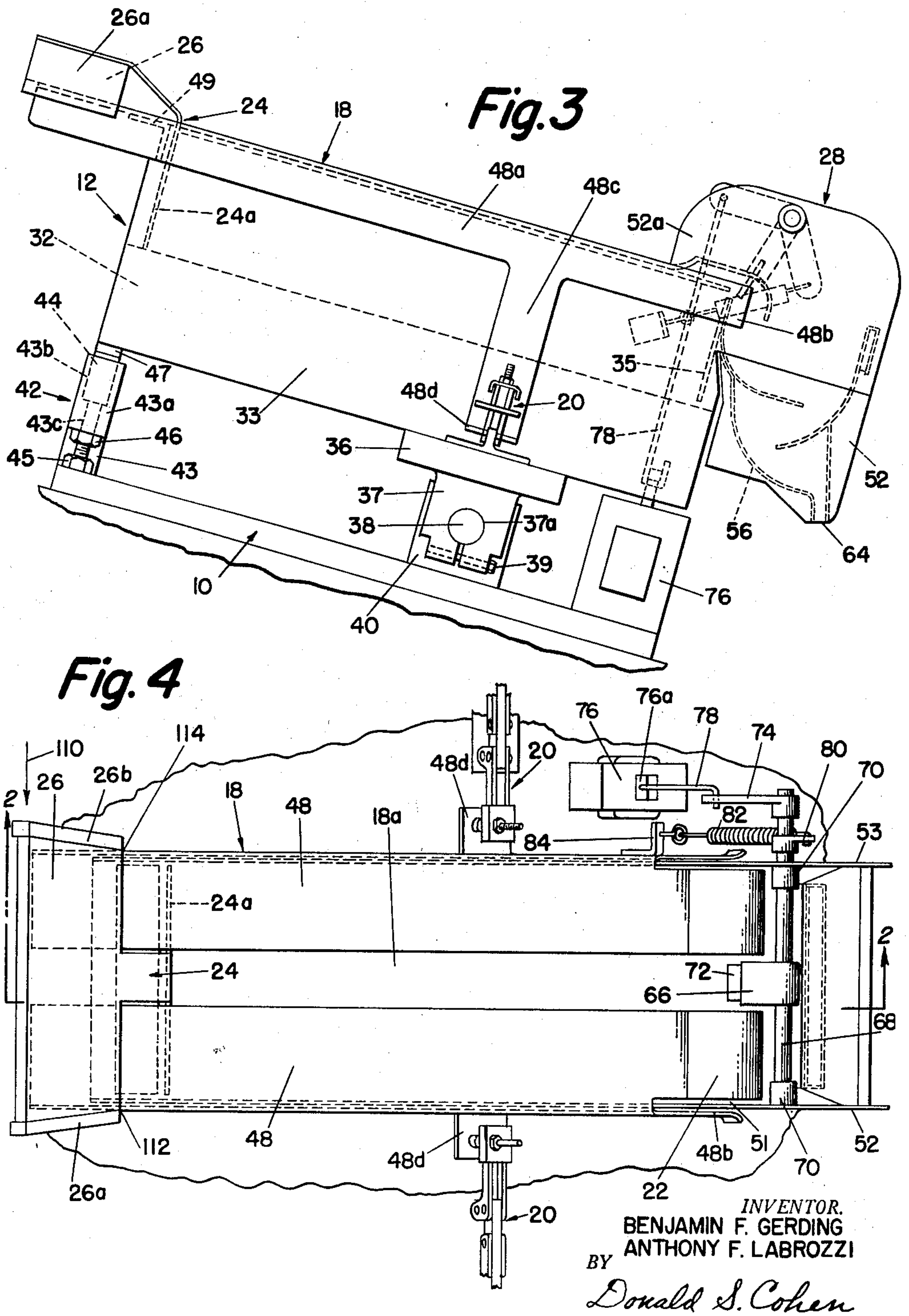
Figure 3 is a fragmentary side elevational view of the apparatus.
Figure 4 is a top view of the apparatus.

Pressure plate 24 comprises a substantially rectangular plate 24*a* (Figure 2) fitting in the holder 12 between side walls 33 and 34 with an angular extension 24*b* extending therefrom through slot 18*a* in the cover 18 and attached to weight 26. Weight 26 is a metal block resting on plates 48 to slide therealong and has downwardly extending side flanges 26*a* and 26*b*. As best seen in Figure 4, the side flanges 26*a* and 26*b* of the weight 26 diverge slightly from front to rear, the distance between the flanges at the front being substantially as wide as the cover 18 (a little play being provided) while the corresponding distance at the rear being greater.

Turning now to Figures 1 and 2, the hopper 28 comprises sides 52 and 53 which are preferably integral extensions of holder side walls 33 and 34 respectively. Upwardly and rearwardly extending sections 52*a* and 53*a* thereof (Figure 1) are located above side walls 33 and 34 to fit into slots 51 (Figure 4) in the cover 18. As shown in Figure 2, three baffle plates 54, 55 and 56 are secured to sides 52 and 53 to span the space therebetween thereby forming a downwardly extending labyrinth passage 58 between their extremities through the hopper 28. The first baffle plate 54 is secured to the front wall 35 of the holder 12 and curves downwardly and away from the front wall. The next baffle plate 55 is located adjacent the front of the hopper 28 and curves downwardly and under the first baffle plate 54. The last baffle plate 56 extends from the bottom of the first baffle plate 54 and curves downwardly and under the second baffle plate 55. A downwardly extended flange 56*a* with a plate 62 secured to baffle plate 55 forms a chute 64 extending downwardly and away from the labyrinth passage 58.

Referring to Figures 1 and 4, the gate mechanism 30 comprises a gate 66 secured to and extending from a shaft 68 which is pivotally supported in bearings 70 on sides 52 and 53 of hopper 28. Gate 66 extends into the slot 18*a* of cover 18 and is provided with a flexible tip 72 which may be made from rubber or leather; this tip 72 extends across the passage 57 between the guide portion 22 and the front wall 35 as can be seen best in Figure 2. Shaft 68 extends beyond side 53 of the hopper 28 (Figures 1 and 4) and an actuating arm 74 is secured thereto and connected by means of a rod 78 to the core 76*a* of a solenoid 76 mounted on the top 10*a* of base 10. An arm 80 also secured to the shaft 68 (Figure 1) extends therefrom oppositely from the actuating arm 74 and spring 82 anchored to holder 12 by bracket 84 is connected thereto. The circuit of the coil of solenoid 76 includes a switching mechanism (not shown) for intermittent energization thereof at a desired frequency. Preferably, this mechanism is a conventional type capable of varying the frequency of coil energization.

Figure 5:
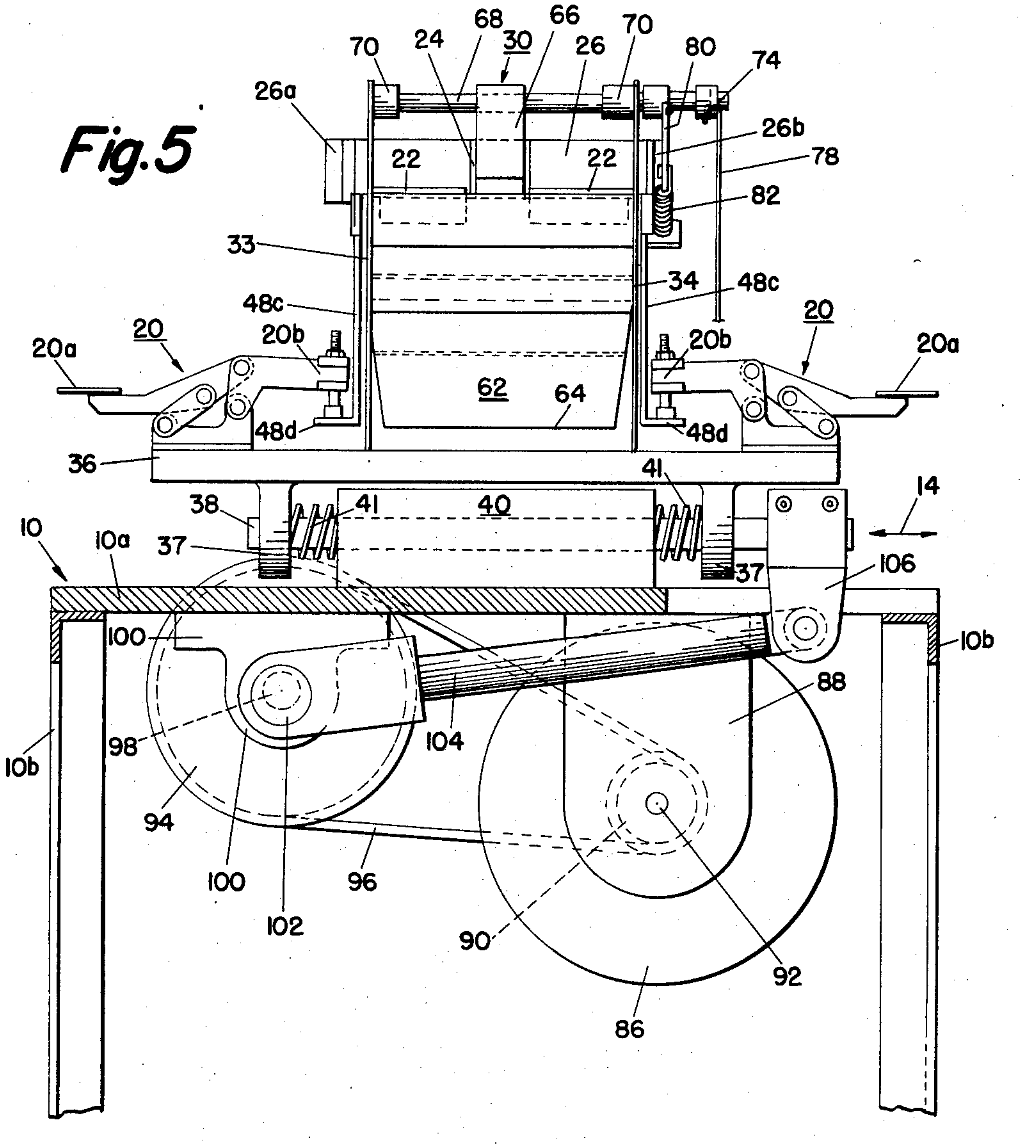
Figure 5 is a front elevational view of the apparatus.

Referring to Figure 5, the mechanism for reciprocating the holder 12 comprises a motor 86 mounted beneath the base top 10*a* by brackets 88. A pulley 90 secured to the motor shaft 92 drives a second pulley 94 by way of a belt 96. Pulley 94 is secured to a shaft 98 which is supported beneath the base top 10*a* by bearings 100. The end of shaft 98 has mounted thereon an eccentric bearing member 102. One end of a drive rod 104 is rotatably mounted on this eccentric bearing member 102 and its other end is hingedly connected to a clevis 106 which is secured to shaft 38. Rotation of the eccentric bearing member 102 by shaft 98 causes the drive rod 104 to reciprocate shaft 38 and consequently the holder 12 which is secured thereto.

In operation, cover 18 is removed from the holder 12 and a box of the electrical components 16, with the components arranged in substantially parallel relation as shown in Figure 1, is placed in the holder with one end resting against the front wall 35. The top of the box is either removed or folded back so that the components 16 are exposed. The cover 18 is replaced on the holder 12 and extension 24*a* of pressure plate 24 is fitted in the box behind the components as shown in Figure 2. Since the holder 12 is tilted, the weight 26 riding on the cover 18 will cause the pressure plate 24 to urge the components 16 toward front wall 35. The handles 20*a* of clamps 20 are pressed down, forcing the clamping heads 20*b* (Figure 5) to engage hold down flanges 48*d* to secure the cover 18 tightly on the holder 12. Motor 86 is started causing the holder 12 to reciprocate from side to side as indicated by arrows 14 in Figures 1 and 5. The combination of this reciprocating motion plus the force on the components applied by pressure plate 24 causes them to flow forward and over the front wall 35 through the passage 57 beneath guide portion 22. This flow of the components 16 is impeded by the lip 72 of gate 30 which, as previously described, extends across the passage 57. When the coil of solenoid 76 is energized intermittently, the core 76*a* is reciprocated, imparting like motion to shaft 68 and gate 66 via rod 78, arms 74 and 80 and spring 82 as best seen in Figure 1. This swings gate 66 open and closed and thereby controls the flow of components through passage 57. The frequency of gate oscillation controls the rate and character of the flow of components from the box and prevents jamming of the components in passage 57. If any jamming occurs in the passage 57, lip 72 will push back against the components as the gate 66 swings back across the passage and break the jam.

Upon leaving the passage 57, the components 16 drop into the hopper 28 and land first on the baffle 54. They then pass through labyrinth passage 58 by sliding from baffle 54 to baffle 55 and then to baffle 56, after which they drop through chute 64 which can be placed to feed the components into a machine for further handling. The baffles maintain the components in a horizontal position so that they are fed from the apparatus in such a position. As the components 16 flow from the box, the weight 26 slides down cover 18 to maintain pressure on the components by the pressure plate 24. The diverging flanges 26*a* and 26*b* of the weight help the movement of the weight down the cover 18. Referring to Figure 4, as the holder moves in one direction, for instance, in the direction of arrow 110, the weight will be thrown in the same direction causing it to pivot slightly about the point 114 and this edges the bottom side as viewed in Figure 4 forward. When the holder reverses its direction, the weight will pivot slightly about point 112 so that the upper side, as viewed therein, will move forward. Thus, the weight 26 tends to crawl forward as the holder 12 reciprocates from side to side. When the box is empty, the motor and solenoid are turned off, the cover removed and the empty box is replaced.

It will thus be seen that the objects set forth above, among those made apparent from the preceding description, are efficiently attained and, since certain changes may be made in carrying out the above method and in the construction set forth without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. Apparatus for feeding elongated objects from a container in which they are arranged substantially parallel to one end thereof comprising the combination of holding means for the container comprising a substantially rectangular bottom plate on which the container is adapted to sit and which is tilted so that its front end is lower than its other end, a pair of opposed substantially parallel side walls extending from the sides of the bottom, a front wall at the front end of the bottom, against which the one end of the container is adapted to rest, said front wall having an upper edge, and a cover extending over and between said side walls and being spaced from the upper edge of said front wall to provide an opening between said cover and the upper edge of said front wall, means for reciprocating said holding means from side to side and means for urging said objects toward the front wall whereby the objects will flow over the upper edge of said front wall.

2. The combination as set forth in claim 1 in which the cover has a longitudinal slot extending from its front edge and the means for urging the objects toward the front wall comprises a plate extending between said side walls and substantially parallel to said front wall, a weight slidably supported on said cover and an arm extending from the plate through the slot in the cover and connected to said weight.

3. The combination as set forth in claim 2 in which the front end portion of the cover is U-shaped and extends over the front wall to guide the objects thereover.

4. The combination as set forth in claim 3 including a gate mechanism extending across the space between the U-shaped end portion of the cover and the upper edge of the front wall and adapted to control the flow of objects over said front wall.

5. The combination as set forth in claim 4 in which the gate mechanism comprises an arm pivotally mounted over said front wall and having a lip extending through the slot in the cover and across the space between the U-shaped end portion and the front wall and means for intermittently swinging said arm to open said space and allow the objects to flow therethrough.

6. The combination as set forth in claim 1 including a hopper attached to the front wall to catch the objects as they flow thereover, said hopper having a downwardly extending labyrinth passageway ending in a downwardly extending chute.

7. Apparatus for feeding elongated objects from a container in which they are arranged substantially parallel to one end thereof comprising the combination of a supporting base having a tilted top so that the front end of the top is lower than the rear end, an elongated bearing mounted on said top adjacent and substantially parallel to the front edge thereof, a shaft slidably mounted in said bearing, a supporting plate mounted on and secured to said shaft, holding means for said container mounted on said supporting plate so that the container is tilted substantially parallel to said base top, means for reciprocating said shaft and means for urging said objects toward the front edge of said top.

8. The combination as set forth in claim 7 in which the holding means for the container comprises a bottom plate on which the container is adapted to sit mounted on the supporting plate substantially parallel to the top of said supporting base, a pair of opposed substantially parallel side walls extending from the sides of the bottom plate, a front wall at the front end of the bottom against which one end of the container is adapted to rest, and a cover extending over and between said side walls.

9. The combination as set forth in claim 8 in which said cover has a U-shaped portion extending over the top edge of said front wall and a longitudinal slot extending from its front edge, and the means for urging the objects toward the front wall comprises a plate extending between said side walls and substantially parallel to said front wall, a weight slidably supported on said cover and an arm extending from said plate through said slot in the cover and connected to said weight.

10. The combination as set forth in claim 9 in which said cover has hold down arms extending downwardly along the outside of the side walls and a flange extending outwardly from the end of each arm and clamping means mounted on the supporting plate to engage the flanges and hold the cover tightly on the side walls.

11. Apparatus for feeding elongated objects from an elongated container in which they are arranged substantially parallel to one end thereof comprising means for holding said container including a substantially rectangular bottom plate, a pair of opposed substantially parallel side walls extending from said bottom plate, a front wall at one end of said bottom plate, said front wall having an upper edge, and a cover extending over and between said side walls, said cover having a U-shaped front end portion which extends over and is spaced from the upper edge of said front wall to provide a passageway between said cover and the upper edge of said front wall, means for reciprocating said holder and container from side to side, and means for urging said objects toward said front wall whereby the objects will flow over the upper edge of said front wall.

12. Apparatus for feeding elongated objects from an oblong container in which they are arranged substantially parallel to one end thereof comprising means for holding said container including a substantially rectangular bottom plate, a pair of opposed substantially parallel side walls extending from the bottom plate, a front wall at one end of said bottom plate, said front wall having an upper edge, and a cover extending over and between said side walls and being spaced from the upper edge of said front wall to provide an opening between said cover and the upper edge of said front wall, means for reciprocating said holder and container from side to side, and means between said side walls for engaging said objects and urging said objects toward said front wall whereby the objects will flow over the upper edge of said front wall.

References Cited in the file of this patent

UNITED STATES PATENTS

| | | |
|---|---|---|
| Re. 21,136 | Davis | July 4, 1939 |
| 81,404 | Pierce | Aug. 25, 1868 |
| 632,485 | Cody | Sept. 5, 1899 |
| 1,012,106 | Seavey | Dec. 19, 1911 |
| 1,095,277 | Hermann et al. | May 5, 1914 |
| 1,694,897 | Washburn | Dec. 11, 1928 |
| 2,275,849 | Eraser | Mar. 10, 1942 |
| 2,500,438 | Tandler et al. | Mar. 14, 1950 |
| 2,635,753 | McLean | Apr. 21, 1953 |
| 2,679,334 | Brown et al. | May 25, 1954 |